(12) United States Patent
Yanagisawa et al.

(10) Patent No.: US 6,841,606 B2
(45) Date of Patent: Jan. 11, 2005

(54) NATURAL RUBBER MASTER BATCH, PRODUCTION METHOD THEREOF, AND NATURAL RUBBER COMPOSITION

(75) Inventors: Kazuhiro Yanagisawa, Tokyo (JP); Kazuaki Someno, Tokyo (JP); Uchu Mukai, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 124 days.

(21) Appl. No.: 10/200,452

(22) Filed: Jul. 23, 2002

(65) Prior Publication Data

US 2003/0088006 A1 May 8, 2003

(30) Foreign Application Priority Data

Jul. 27, 2001 (JP) .......................................... 2001-227748
Jul. 27, 2001 (JP) .......................................... 2001-228123

(51) Int. Cl.$^7$ ................................................. C08K 3/18
(52) U.S. Cl. .................................... 524/432; 524/575.5
(58) Field of Search ............................... 524/432, 575.5

(56) References Cited

U.S. PATENT DOCUMENTS 4,029,633 A   6/1977   Hagopian et al.
5,908,893 A   6/1999   Kawasaki et al.
6,048,923 A * 4/2000   Mabry et al. ................ 524/496

FOREIGN PATENT DOCUMENTS

EP   0 584 597 A1   3/1994
EP   11071408       3/1999

OTHER PUBLICATIONS

XP002245219, Feb. 9, 1976.

* cited by examiner

*Primary Examiner*—Peter D. Mulcahy
(74) *Attorney, Agent, or Firm*—Sughrue Mion, PLLC

(57) ABSTRACT

The natural rubber master batch of the present invention is prepared by mixing a natural rubber latex having its amide linkages cleaved and an aqueous slurry having a filler dispersed in water. Alternatively, the natural rubber master batch is prepared by a method including a step for mixing a natural rubber latex and an aqueous slurry containing dispersed fillers having a specific particle size distribution and a limited range of 24M4DBP absorption. The natural rubber composition of the present invention is prepared by compounding natural rubber, which contains non-rubber components prepared by cleaving amide linkages of natural rubber latex, with silica and/or a particular inorganic filler.

19 Claims, No Drawings

NATURAL RUBBER MASTER BATCH, PRODUCTION METHOD THEREOF, AND NATURAL RUBBER COMPOSITION

BACKGROUND OF THE INVENTION

1. Field of the Invention

The present invention relates to a natural rubber master batch, a production method thereof, and a natural rubber composition. More specifically, the present invention relates to a natural rubber composition having improved in processability, reinforcing property and abrasion resistance, a natural rubber master batch suitable for producing the natural rubber composition, and a production method of the natural rubber maser batch.

2. Description of the Prior Art

Generally, natural rubber is known to be excellent in mechanical properties, low heat build-up, and abrasion resistance. In addition, natural rubbers receive attention as environmentally friend materials. Natural rubbers contain non-rubber components having amide linkages (protein). It has been known that the non-rubber component in natural rubber has an aging resistant effect and a vulcanization accelerating effect. In contrast, the non-rubber component has a drawback of reducing the processability of natural rubber as compared with synthetic rubbers because it increases the viscosity of rubbers by molecular chain entanglement caused by hydrogen bonding between amide linkages.

In recent special applications such as a natural rubber product for medical use, is used natural rubber having its non-rubber component such as proteins removed to a considerable extent by centrifugal separation of latex (Japanese Patent Application Laid-Open Nos. 6-56902, 8-143606, 11-71408, 2000-19801, etc.). Such natural rubber, however, involves a problem of a lowered elastic modulus and a poor aging property because the non-rubber component having the aging resistant effect and the vulcanization accelerating effect is removed nearly completely.

As a production method of rubbers of excellent processability, generally known is a method using a wet master batch. In this method, a slurry is prepared in advance by mixing a filler such as carbon black and silica with water in a certain proportion and then finely dispersing the filler throughout water by mechanical force. The slurry is then mixed with a rubber latex, followed by addition of a coagulant such as acids, inorganic salts and amines to coagulate the mixture, and recovery and drying of the coagulated product (Japanese Patent Publication Nos. 36-22729 and 51-43851).

As compared with a wet master batch for synthetic rubbers, a wet master batch comprising natural rubber and a filler such as carbon black, silica, other inorganic filler, etc. shows a smaller improving effect on the processability and has a drawback of hardly attaining a good dispersion of the filler. When excessively applying a mechanical shearing force to obtain a slurry with a good dispersion, aggregates (structures) of filler are broken to decrease the reinforcing property and deteriorate the abrasion resistance.

SUMMARY OF THE INVENTION

An object of the present invention, in view of the foregoing, is to provide a natural rubber master batch for producing a natural rubber composition which is improved in the processability, the reinforcing property and the abrasion resistance.

Another object of the present invention is to provide a production method of the natural rubber master batch.

Still another object of the present invention is to provide a natural rubber composition having been greatly improved in the processability, and simultaneously, having been balanced in an anti skidding property on wet roads, a low fuel consumption and an abrasion resistance in high level, without adversely affecting the elastic modulus and aging characteristics attributable to natural rubber.

Further still another object of the present invention is to provide a tire which is produced by using the natural rubber composition.

As a result of intensive study in view of attaining the above objects, the inventors have found that the problems are solved by modifying known production methods of natural rubber master batches, and by using a natural rubber treated by a specific method so as to contain the non-rubber component. The present invention has been accomplished on the basis of this finding.

Thus, in a first aspect, the present invention provides a method for producing a natural rubber master batch, which comprises Step 1 for cleaving amide linkages in a natural rubber latex; and Step 2 for mixing the latex having its amide linkages cleaved with an aqueous slurry having been dispersed with at least one filler selected from the group consisting of carbon black, silica and an inorganic filler represented by the following Formula I:

$$nM^1 \cdot xSiO_y \cdot zH_2O \quad (I)$$

wherein $M^1$ is at least one member selected from the group consisting of metals of aluminum, magnesium, titanium, calcium and zirconium, oxides of the preceding metals, hydroxides of the preceding metals, hydrates of the preceding oxides and hydroxides, and carbonates of the preceding metals; n is an integer of 1 to 5; x is an integer of 0 to 10; y is an integer of 2 to 5; and z is an integer of 0 to 10.

In a second aspect, the present invention provides a method for producing a natural rubber master batch, which comprises a step for mixing a natural rubber latex with an aqueous slurry having been dispersed with at least one filler selected from the group consisting of carbon black, silica and an inorganic filler represented by the above Formula I, wherein (i) the particle size distribution of the filler in the aqueous slurry is 25 μm or less in terms of a volume average particle size (mv) and 30 μm or less in terms of a 90 volume % particle size (D90), and (ii) a 24M4DBP absorption of dried filler recovered from the slurry is maintained at 93% or more of that of a filler before dispersed into water.

In a third aspect, the present invention provides a natural rubber master batch produced by mixing a natural rubber latex having amide linkages cleaved and a slurry having been dispersed with at least one filler selected from the group consisting of carbon black, silica and an inorganic filler represented by the above Formula I, and by coagulating the resultant mixture.

In a fourth aspect, the present invention provides a natural rubber composition comprising (A) a natural rubber containing non-rubber components obtained by cleaving amide linkages of a natural rubber latex, and (B) silica and/or an inorganic filler represented by the above Formula I.

In a fifth aspect, the present invention provides a tire produced by using the natural rubber composition.

DETAILED DESCRIPTION OF THE INVENTION

The first method of the present invention for producing the natural rubber master batch includes Step 1 for cleaving amide linkages in a natural rubber latex, and Step 2 for mixing the amide-linkage-cleaved latex with a slurry prepared in advance by dispersing into water at least one filler selected from the group consisting of carbon black, silica and the inorganic fillers of Formula I.

In Step 1, the cleavage of the amide linkages in the natural rubber latex can be carried out by various methods. Of the methods, a method using protease or a method using a derivative of aromatic polycarboxylic acid is preferably used.

In the method of using protease, the protease hydrolyzes amide linkages present in a surface layer of natural rubber latex particles. Examples of protease include acidic protease, neutral protease and alkaline protease, with the alkaline protease being preferred in the present invention in view of effectiveness.

The cleavage of the amide linkages by protease can be carried out under conditions optimum to enzyme to be mixed. For example, when a natural rubber latex is mixed with Alkalase 2.5L type DX manufactured by Novozymes A/S, the treatment is preferably conducted at 20 to 80° C. The pH range is usually 6.0 to 12.0. The amount of added protease is usually 0.01 to 2% by weight, preferably 0.02 to 1% by weight based on the natural rubber latex.

The derivative of aromatic polycarboxylic acid to be used in another method is represented by the following Formula II:

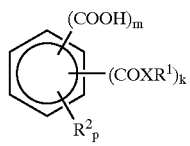

(II)

wherein:

m and k are each integer of 1 to 3, p is an integer of 1 to 4 while m+k+p=6, when m≧2, the carboxylic groups, partly or entirely, may be form an acid anhydride group, X is oxygen atom, $NR^3$ wherein $R^3$ is hydrogen atom or alkyl group having 1 to 24 carbon atoms, or $—O(R^4O)_q$ wherein $R^4$ is alkylene group having 1 to 4 carbon atoms, and q is an integer of 1 to 5, $R^1$ is alkyl group having 1 to 24 carbon atoms, alkenyl group having 2 to 24 carbon atoms, or aryl group having 6 to 24 carbon atoms, each being optionally substituted by halogen atom partly or entirely, $R^2$ is hydrogen atom, —OH, alkyl group, alkenyl group, or aryl group, each being optionally substituted by halogen atom partly or entirely.

Of the derivatives of aromatic polycarboxylic acid of Formula II, preferred are derivatives of phthalic acid, trimellitic acid, pyromellitic acid and anhydrides of the preceding acids. Specifically, preferred are monostearyl phthalate, monodecyl phthalate, monooctyl phthalamide, polyoxyethylenelauryl phthalate, monodecyl trimellitate, monostearyl trimellitate, monostearyl pyromellitate, and distearyl pyromellitate.

The conditions for mixing the derivative of aromatic polycarboxylic acid with the natural rubber latex may be selected depending on the kinds of natural rubber latex and the kinds of derivative of aromatic polycarboxylic acid to be used.

The amount of the added derivative of aromatic polycarboxylic acid is preferably 0.01 to 30% by weight based on the amount of the natural rubber latex. An added amount of less than 0.01% by weight may fail to sufficiently reduce a Mooney viscosity. An added amount exceeding 30% by weight creates no additional effect corresponding to the increased amount, and additionally, may adversely affect the reinforcing characteristic of vulcanized rubber. Although the added amount varies within the above range depending on the kind or grade of the natural rubber latex to be used, a range from 0.05 to 20% by weight is preferred in view of production costs and properties of the natural rubber master batch to be prepared.

In Step 1 for cleaving amide linkages of natural rubber latex, a surfactant is preferably used to enhance the stability of latex. The surfactant may be anionic, cationic, nonionic, and amphoteric, with anionic and nonionic surfactants being preferred. The amount of the added surfactant may be suitably selected depending on the properties of the natural rubber latex, and usually 0.01 to 2% by weight, preferably 0.02 to 1% by weight based on the natural rubber latex.

In Step 2 of the first method for producing the natural rubber master batch, is used a slurry prepared in advance by dispersing into water at least one filler selected from the group consisting of carbon black, silica and the inorganic fillers of Formula I. The method for preparing the slurry may be a known method, and not specifically limited.

The second method of the present invention for producing the natural rubber master batch includes a step for mixing a natural rubber latex with a slurry having been dispersed with at least one filler selected from the group consisting of carbon black, silica and an inorganic filler represented by the above Formula I, wherein it is required that (i) the particle size distribution of the filler in the aqueous slurry is 25 μm or less in terms of a volume average particle size (mv) and 30 μm or less in terms of a 90 volume % particle size (D90), and (ii) a 24M4DBP absorption of dried filler recovered from the slurry is 93% or more of that of a filler before dispersed into water.

The particle size distribution is preferably 20 μm or less by mv and 25 μm or less by D90. Excessively large particle size cause insufficient dispersion of filler in rubbers to decrease the reinforcing property and the abrasion resistance. In contrast, when a shearing force is excessively applied to the slurry to reduce the particle size, the aggregated structure of filler is broken to cause a lowering of the reinforcing property. Therefore, the 24M4DBP absorption of the dried filler recovered from the slurry is required to be maintained at 93% or more, preferably 96 or more, of that of the filler before made into the slurry.

In the first and second methods for producing the natural rubber master batch, the aqueous slurry of the filler is prepared by using a high-shear mixer of rotor-stator type, a high-pressure homogenizer, an ultrasonic homogenizer, a colloid mill, etc. For example, the slurry is prepared by charging predetermined amounts of a filler and water into a colloid mill, and then stirring the mixture for a certain period of time at high speed.

Carbon blacks generally used in rubber industries can be used in the present invention. For example, carbon blacks of various grades such as SAF, ISAF, HAF, FEF and GPF may be used alone or in combination.

Although silica used in the present invention is not specifically limited, precipitated silica, fumed silica and colloidal silica are preferably used.

The inorganic filler of Formula I may include alumina ($Al_2O_3$) such as γ-alumina and α-alumina; alumina monohydrate ($Al_2O_3.H_2O$) such as böhmite and diaspore; aluminum hydroxide [$Al(OH)_3$] such as gibbsite and bayerite; aluminum carbonate [$Al_2(CO_3)_2$]; magnesium hydroxide [$Mg(OH)_2$]; magnesium oxide (MgO); magnesium carbonate ($MgCO_3$); talc ($3MgO.4SiO_2.H_2O$); attapulgite ($5MgO.8SiO_2.9H_2O$); titanium white ($TiO_2$); titanium black ($TiO_{2n-1}$); calcium oxide (CaO); calcium hydroxide [$Ca(OH)_2$]; aluminum magnesium oxide ($MgO.Al_2O_3$); clay ($Al_2O_3.2SiO_2$); kaolin ($Al_2O_3.2SiO_2.2H_2O$); pyrophyllite ($Al_2O_3.4SiO_2.H_2O$); bentonite ($Al_2O_3.4SiO_2.2H_2O$); aluminum silicate ($Al_2SiO_5$, $Al_4.3SiO_4.5H_2O$, etc. magnesium silicate ($Mg_2SiO_4$, $MgSiO_3$, etc.); calcium silicate ($Ca_2.SiO_4$, etc.); aluminum calcium silicate ($Al_2O_3.CaO.2SiO_2$, etc.); magnesium calcium silicate ($CaMgSiO_4$); calcium carbonate ($CaCO_3$); zirconium oxide ($ZrO_2$); zirconium hydroxide [$ZrO(OH)_2 \cdot nH_2O$]; zirconium carbonate [$Zr(CO_3)_2$]; and crystalline aluminosilicates having hydrogen, alkali metal or alkaline earth metal for compensating electric charges as in the case of various zeolites. Preferably, $M^1$ of Formula I is at least one member selected from the group consisting of aluminum metal, oxides or hydroxides of aluminum, hydrates of oxides or hydroxides of aluminum, and carbonates of aluminum. The concentration of the filler selected from carbon black, silica and the inorganic fillers of Formula I in the slurry is preferably 0.5 to 60% by weight, more preferably 1 to 30% by weight based on the amount of the slurry.

The amount of the added filler selected from carbon black, silica and the inorganic fillers of Formula I is preferably 5 to 100 parts by weight, more preferably 10 to 70 parts by weight based on 100 parts by weight of the rubber component of the natural rubber master batch. When the filler is added in an amount less than 5 parts by weight, a sufficient reinforcing property cannot be obtained in some cases. An added amount exceeding 100 parts by weight is likely to deteriorate the processability. Carbon black, silica and the inorganic fillers of Formula I may be used singly or in combination of two or more.

The slurry and the natural rubber latex from the step for cleaving the amide linkages are mixed, for example, by adding the latex dropwise into the slurry in a homomixer under stirring, or vice versa, i.e., by adding the slurry dropwise into the latex under stirring. Alternatively, a flow of the slurry is mixed with a flow of the latex in a certain proportion under conditions for creating a vigorous hydraulic stirring.

The natural rubber master batch is coagulated, as employed in known methods, by using a coagulant, for example, acids such as formic acid and sulfuric acid and salts such as sodium chloride. In the present invention, the coagulation may proceed in some cases merely by mixing the natural rubber latex and the slurry without adding coagulant.

In addition to carbon black, silica and the inorganic filler of Formula I, the natural rubber master batch may be added, if desired, with various additives such as surfactants, vulcanizing agents, antioxidants, colorants and dispersants.

The final stage of the method for producing the natural rubber master batch is a drying step which may be carried out by using a usual dryer such as vacuum dryer, air dryer, drum dryer and band dryer. Preferably, the drying step is carried out by applying a mechanical shearing force to improve the dispersion of the filler. With such a drying operation, a rubber excellent in the processability, the reinforcing property and the low fuel consumption can be obtained. The drying under shearing force can be carried out by using a known kneader, preferably by a continuous kneader in view of industrial productivity. More preferably, a corotating or counterrotating twin-screw kneading extruder is used.

When the drying step is conducted under shearing force, the water content of the master batch before drying is preferably 10% or more. If the water content is less than 10%, the improvement in the dispersion of the filler is insufficient in the drying step.

The natural rubber master batch of the present invention is obtained by the methods described above. Alternatively, the natural rubber master batch is obtained by mixing a natural rubber latex having its amide linkages cleaved with a slurry having been prepared by dispersing into water at least one filler selected from the group consisting of carbon black, silica and the inorganic fillers of Formula I, and coagulating the mixture.

The natural rubber composition of the present invention is prepared by using the natural rubber master batch described above. Alternatively, the natural rubber composition is prepared by compounding natural rubber containing non-rubber components or the natural rubber master batch described above with silica and/or the inorganic filler of Formula I.

The natural rubber containing non-rubber components is obtained in the same manner as described above, namely, by a method of cleaving amide linkages in a natural rubber latex, particularly using protease or a derivative of aromatic polycarboxylic acid.

The average particle size of the silica and/or the inorganic filler to be used in the present invention is preferably 5 $\mu$m or less. When exceeding 5 $\mu$m, the reinforcing effect may become insufficient, the abrasion resistance may become poor, and the wet skid resistance may be deteriorated.

In addition to the silica and/or the inorganic filler, carbon black may be used as the filler. The carbon black is not particularly limited, and selected from known carbon blacks generally used as reinforcing filler.

The total amount of the added filler is 10 to 120 parts by weight based on 100 parts by weight of the rubber component. If less than 10 parts by weight, the desired reinforcing property and abrasion resistance cannot be attained. The amount exceeding 120 parts by weight is likely to cause the deterioration of the processability.

The natural rubber composition of the present invention may be further compounded with a coupling agent, if desired, to enhance the bonding between rubber molecules and the fillers. The coupling agent is not specifically limited, and those generally used in known rubber compositions may be used. Examples of the coupling agent include silane coupling agents such as bis(3-triethoxysilylpropyl) polysulfide, γ-mercaptopropyltriethoxysilane, γ-aminopropyltriethoxysilane, N-phenyl-γ-aminopropyltrimethoxysilane, and N-β-aminoethyl-γ-aminopropyltrimethoxysilane; aluminum coupling agents; and titanate coupling agents. The addition amount of the coupling agent is selected from the range of 1 to 20 % by weight based on the filler.

The rubber composition of the present invention may be further compounded with various chemicals generally used in rubber industry, for example, vulcanizing agent, vulcanizing accelerator, antioxidant, scorch retarder, zinc oxide, and stearic acid.

The present invention will be described in more detail with reference to the examples which should not be construed to limit the scope of the present invention thereto.

The measurements in the examples and comparative examples were made in the following manners.
(1) Particle Size Distribution of Filler in Aqueous Slurry (Volume Average Particle Size (mv) and 90 Volume % Particle Size (D90))

Measured by a laser diffraction particle size analyzer (Microtrac FRA Type) using a water solvent (refractive index: 1.33). In each measurement, the particle refractive index was regarded as 1.57. The measurements were conducted immediately after dispersion to prevent the filler from reaggregating together.
(2) 24M4DBP Absorption Measured according to ISO 6894.
(3) Mooney Viscosity ($ML_{1+4}$) of Rubber Composition Measure according to JIS K6300-1994 at 130° C. In Table 3, the results are expressed by indexed numbers while taken the result of Comparative Example 7 as 100 for Example 10 and Comparative Examples 7 and 8, and the result of Comparative Example 9 as 100 for Example 11 and Comparative Examples 9 and 10. The smaller the index number, the better the processability.
(4) Reinforcing Property (Tensile Strength)

Tensile strength was measured at 23° C. according to JIS K6251-1993. The larger the measured value, the higher the reinforcing property.

(5) Abrasion resistance

The abrasion wear was measured by a lambourn abrader machine at room temperature under a slip ratio of 40%. The reciprocal numbers of the measured abrasion wears were employed as the abrasion resistance. The results are expressed by indexed numbers while taken the result of Comparative Example 3 as 100 for Examples 1 to 5 and Comparative Examples 1 to 3, the result of Comparative Example 5 as 100 for Examples 6 to 8 and Comparative Examples 4 and 5, and the result of Comparative Example 6 as 100 for Example 9 and Comparative Example 6. The larger the indexed number, the better the abrasion resistance.

(6) Elastic Modulus ($M_{300}$)

The tensile stress at 300% elongation ($M_{300}$) was measured according to JIS K6251-1993. The results are expressed by indexed numbers while taken the result of Comparative Example 7 as 100 for Example 10 and Comparative Examples 7 and 8, and the result of Comparative Example 9 as 100 for Example 11 and Comparative Examples 9 and 10. The larger the value, the higher the elastic modulus.

(7) Aging Property

The tensile strength was measured according to JIS K6257-1993 after heat aging at 100° C. for 48 h in a Geer oven. The results are expressed by indexed numbers while taken the result of Comparative Example 7 as 100 for Example 10 and Comparative Examples 7 and 8, and the result of Comparative Example 9 as 100 for Example 11 and Comparative Examples 9 and 10. The larger the value, the better the aging property.

EXAMPLES 1-9 AND COMPARATIVE EXAMPLES 1-6

A. Preparation of Latex (i) Latex 1

A field latex of natural rubber (rubber content: 24.2%) was diluted with deionized water to a rubber content of 20%.

(ii) Latex 2

Into Latex 1, were added 0.5% of an anionic surfactant (Demol N manufactured by Kao Corporation) and 0.1% of an alkaline protease (Alkalase 2.5L Type DX manufactured by Novozymes A/S). The mixture was stirred at 40° C. for 8 h to cleave amide linkages in the natural rubber.

(iii) Latex 3

Like the preparation of Latex 2, 0.5% of an anionic surfactant (Demol N manufactured by Kao Corporation) and 3% of monostearyl phthalate were added to Latex 1. The mixture was stirred at 80° C. for 12 h to cleave amide linkages in the natural rubber.

B. Preparation of Aqueous Slurry Dispersed with Filler (i) Slurry 1

Into a colloid mill with a rotor diameter of 50 mm, 1425 g of deionized water and 75 g of carbon black (N110) were charged. The mixture was stirred for 10 min at a rotation speed of 1500 rpm under a rotor-stator gap of 1 mm.

(ii) Slurry 2

Prepared in the same manner as in the preparation of Slurry 1, except for stirring for 10 min at a rotation speed of 5000 rpm under a rotor-stator gap of 0.3 mm.

(iii) Slurry 3

To Slurry 1, 0.05% of an anionic surfactant (Demol N manufactured by Kao Corporation) was added. The mixture was circulated three times in a high pressure homogenizer under a pressure of 500 kPa.

(iv) Slurry 4

Prepared in the same manner as in the preparation of Slurry 3, except for circulated five times in the homogenizer under a pressure of 1000 kPa.

(v) Slurry 5

Into a colloid mill with a rotor diameter of 50 mm, 1425 g of deionized water and 75 g of precipitated silica (Nipsil LP manufactured by Nippon Silica Industrial Co., Ltd.) were charged. The mixture was stirred for 10 min at a rotation speed of 1500 rpm under a rotor-stator gap of 0.5 mm.

(vi) Slurry 6

Prepared in the same manner as in the preparation of Slurry 5, except for stirring for 10 min at a rotation speed of 7000 rpm under a rotor-stator gap of 0.3 mm.

(vii) Slurry 7

Into a colloid mill with a rotor diameter of 50 mm, 1425 g of deionized water and 75 g of gibbsite aluminum hydroxide (Higilite H-43M manufactured by Showa Denko K. K.) were charged. The mixture was stirred for 10 min at a rotation speed of 1500 rpm under a rotor-stator gap of 0.5 mm.

The particle size distribution (mv and D90) of the filler in each aqueous slurry prepared above and 24M4DBP absorption of the dried filler recovered from each aqueous slurry are shown in Table 1.

TABLE 1

| | Slurry | | | | | | |
|---|---|---|---|---|---|---|---|
| | 1 | 2 | 3 | 4 | 5 | 6 | 7 |
| Filler | CB | CB | CB | CB | silica | silica | Aluminum hydroxide |
| Particle size distribution (μm) | | | | | | | |
| mv | 29.6 | 8.2 | 15.1 | 6.5 | 31.4 | 13.2 | 5.1 |
| D90 | 38.3 | 12.4 | 19.5 | 11.1 | 44.6 | 24.0 | 8.8 |
| Structure after recovery/drying | | | | | | | |
| 24M4DBP (ml/100 g) | 97 | 95 | 96 | 88 | 145 | 144 | 52 |
| Retention of 24M4DBP (%) | 99.0 | 96.9 | 98.0 | 89.8 | 96.7 | 96.0 | 100.0 |

| 24M4DBP absorption of filler before made into slurry | |
|---|---|
| Filler | 24M4DBP (ml/100 g) |
| CB*[1] | 98 |
| Silica*[2] | 150 |
| Aluminum hydroxide*[3] | 52 |

Note
*[1]Carbon black N110
*[2]Nipsil LP manufactured by Nippon Silica Industrial Co., Ltd.
*[3]Higilite H-43M manufactured by Showa Denko K.K.

C. Coagulation Step

Into a homomixer, were charged each latex and slurry prepared above so that 50 parts by weight of the filler shown in Table 2 was mixed with 100 parts by weight of the rubber component. While stirring the mixture, formic acid was added until the mixture reached pH 4.5. The coagulated master batch was recovered, washed with water, and dehydrated until the water content was educed to about 40%.

D. Drying Step

The dehydrated master batch from the coagulation step was dried by (i) a band dryer method in which the drying was carried out at 120° C. using a band dryer, or (ii) a twin-screw kneading extruder method in which the drying was carried out at a barrel temperature of 120° C. under a rotation speed of 100 rpm using a twin-screw kneading extruder (corotating screw diameter: 30 mm; L/D=35; three vent holes) manufactured by Kobe Steel, Ltd.

The content of filler in each master batch thus prepared was about 50 parts by weight based on 100 parts by weight of natural rubber.

In Comparative Examples 3, 5 and 6, 100 parts by weight of natural rubber (SMR), instead of a master batch, was mixed with 50 parts by weight of filler in a plastomill by a so-called dry kneading.

E. Preparation of Rubber Composition

Each filler-compounded rubber (100 parts by weight of natural rubber and 50 parts by weight of filler) prepared by master batch kneading or by dry kneading was compounded with 3 parts by weight of zinc oxide, 1.2 parts by weight of sulfur, 2 parts by weight of stearic acid, 1 part by weight of N-t-butyl-2-benzothiazolylsulfenamide (TBBS), 1 part by weight of N-phenyl-N'-1,3-dimethylbutyl-p-phenylenediamine (6C), and optionally 4 parts by weight of a silane coupling agent (Si69 (trademark) manufactured by Degussa Aktiengesellschaft) when silica was used as the filler. The mixture was kneaded in a plastomill to prepare each rubber composition.

The resulting rubber composition was tested for Mooney viscosity, and after vulcanization at 150° C. for 30 min, tested for the tensile strength and abrasion resistance by the methods described above. The results are shown in Table 2.

Examples 6 to 8 and Comparative Examples 4 and 5 relates to compositions compounded with silica. The master batch was prepared by the second production method for Examples 6 and 7, and by the first production method for Example 8. Upon comparing Examples 6 to 8 with Comparative Example 4 in which the production methods of the present invention were not employed, it can be seen that the rubber compositions of Examples 6 to 8 are well balanced in the processability, reinforcing property and abrasion resistance at high level. The rubber composition of Comparative Example 5 which was prepared by dry kneading showed an extremely poor processability.

Example 9 and Comparative Example 6 relates to compositions compounded with aluminum hydroxide. The master batch of Example 9 was prepared by the second production method of the present invention. Upon comparing Example 9 with Comparative Example 6 in which the dry kneading was employed, it can be seen that Example 9 is

TABLE 2

|  | Ex. 1 | Ex. 2 | Ex. 3 | Ex. 4 | Com. Ex. 1 | Com. Ex. 2 | Ex. 5 | Com. Ex. 3 |
| --- | --- | --- | --- | --- | --- | --- | --- | --- |
| Filler | CB | CB | CB | CB | CB | CB | CB | CB |
| Compounding method | MB | MB | MB | MB | MB | MB | MB | dry kneading |
| Preparation of MB | | | | | | | | |
| A latex | latex 1 | latex 1 | latex 1 | latex 3 | latex 1 | latex 1 | latex 2 | — |
| B slurry | slurry 2 | slurry 3 | slurry 3 | slurry 3 | slurry 4 | slurry 1 | slurry 1 | — |
| D drying | twin-screw extruder | band dryer | twin-screw extruder | twin-screw extruder | twin-screw extruder | twin-screw extruder | twin-screw extruder | — |
| Properties | | | | | | | | |
| Mooney viscosity | 77 | 85 | 80 | 74 | 75 | 97 | 88 | 102 |
| Reinforcing property (tensile strength) (MPa) | 30.6 | 29.3 | 30.5 | 30.2 | 24.9 | 27.3 | 29.6 | 29.0 |
| Abrasion resistance (indexed number) | 106 | 107 | 107 | 105 | 88 | 97 | 102 | 100 |

|  | Ex. 6 | Ex. 7 | Com. Ex. 4 | Ex. 8 | Com. Ex. 5 | Ex. 9 | Com. Ex. 6 |
| --- | --- | --- | --- | --- | --- | --- | --- |
| Filler | silica | silica | silica | silica | silica | aluminum hydroxide | aluminum hydroxide |
| Compounding method | MB | MB | MB | MB | dry kneading | MB | dry kneading |
| Preparation of MB | | | | | | | |
| A latex | latex 1 | latex 1 | latex 1 | latex 2 | — | latex 1 | — |
| B slurry | slurry 6 | slurry 6 | slurry 5 | slurry 5 | — | slurry 7 | — |
| D drying | band dryer | twin-screw extruder | band dryer | band dryer | — | twin-screw extruder | — |
| Properties | | | | | | | |
| Mooney viscosity | 119 | 108 | 131 | 120 | 132 | 55 | 66 |
| Reinforcing property (tensile strength) (MPa) | 29.1 | 29.2 | 24.6 | 27.8 | 26.7 | 23.5 | 21.4 |
| Abrasion resistance (indexed number) | 104 | 104 | 96 | 102 | 100 | 121 | 100 |

Note:
CB is carbon black.
MB is master batch.

As shown in Table 2, Examples 1 to 5 and Comparative Examples 1 to 3 relates to compositions compounded with carbon black. The master batch was prepared by the second production method for Examples 1 to 3, by the first production method for Example 5, and by a method satisfying both the first and second production methods for Example 4. Upon comparing Examples 1 to 5 with Comparative Examples 1 and 2 in which the production methods of the present invention were not employed, it can be seen that the rubber compositions of Examples 1 to 5 are well balanced in the processability, reinforcing property and abrasion resistance at high level. The rubber composition of Comparative Example 3 which was prepared by dry kneading showed an extremely poor processability.

well balanced in the processability, reinforcing property and abrasion resistance at high level.

PREPARATION OF RUBBER COMPOSITION FOR TEST

PREPARATION EXAMPLE 1

Natural Rubber I (1) Step for Cleaving Amide Linkages of Natural Rubber Latex

Into a natural rubber latex containing 20% of rubber component, were added 0.5% of an anionic surfactant (Demol N manufactured by Kao Corporation) and 0.1% of an alkaline protease (Alkalase 2.5L Type DX manufactured by Novozymes A/S). The mixture was stirred at 40° C. for 8 h.

(2) Step for Coagulation and Drying

The natural rubber latex from Step 1 was coagulated by acid to obtain a rubber product, which was then dried by passing five times through a drum dryer controlled at 130° C., and further dried in a vacuum dryer at 40° C. for 8 h, thereby obtaining the natural rubber I.

PREPARATION EXAMPLE 2

Natural Rubber II

The natural rubber latex (B) obtained in the amide-cleaving Step 1 of Preparation Example 1 was centrifuged at 10000 rpm for 30 min, and then, coagulated and dried in the same manner as in Preparation Example 1 to prepare the natural rubber II.

EXAMPLE 10

Each rubber composition was prepared by compounding 100 parts by weight of the natural rubber I prepared in Preparation Example 1, 40 parts by weight of silica and other compounding agents in respective amounts shown in Table 3. The rubber composition was tested for Mooney viscosity before vulcanization, and tested for elastic modulus ($M_{300}$) and aging property after vulcanization. The vulcanization was carried out at 150° C. for 30 min. The results are shown in Table 3.

COMPARATIVE EXAMPLES 7 AND 8

Each rubber composition was prepared in the same manner as in Example 10, except for using, in place of the natural rubber I, a general natural rubber (SMR) or the natural rubber II prepared in Preparation Example 2. The results of evaluation tests are shown in Table 3.

EXAMPLE 11

A rubber composition was prepared in the same manner as in Example 10, except for using, in place of 40 parts by weight of silica, 30 parts by weight of silica and 30 parts by weight of aluminum hydroxide as the filler, and changing the amount of the silane coupling agent to 2 parts by weight. The results of evaluation tests are shown in Table 3.

COMPARATIVE EXAMPLES 9 AND 10

Each rubber composition was prepared in the same manner as in Example 11, except for using, in place of the natural rubber I, a general natural rubber (SMR) or the natural rubber II prepared in Preparation Example 2. The results of evaluation tests are shown in Table 3.

TABLE 3

| Compounding Formulation (part by weight) | Com. Ex. 7 | Com. Ex. 8 | Ex. 10 |
|---|---|---|---|
| Natural rubber | | | |
| type or preparation method | SMR*1 | Method 2 | Method 1 |
| amount | 100 | 100 | 100 |
| Silica*2 | 40 | 40 | 40 |
| Aluminum hydroxide*3 | — | — | — |
| Silane coupling agent*4 | 3 | 3 | 3 |
| Stearic acid | 2 | 2 | 2 |
| Zinc oxide | 3 | 3 | 3 |
| Vulcanization accelerator | 1.5 | 1.5 | 1.5 |

TABLE 3-continued

| | | | |
|---|---|---|---|
| TBBS*5 | | | |
| Sulfur | 1.5 | 1.5 | 1.5 |
| Mooney viscosity ($ML_{1+4}$) at 130° C. (indexed number) | 100 | 81 | 85 |
| Elastic modulus ($M_{300}$) (indexed number) | 100 | 68 | 105 |
| Aging property (indexed number) | 100 | 86 | 110 |

| Compounding Formulation (part by weight) | Com. Ex. 9 | Com. Ex. 10 | Ex. 11 |
|---|---|---|---|
| Natural rubber | | | |
| type or preparation method | SMR*1 | Method 2 | Method 1 |
| amount | 100 | 100 | 100 |
| Silica*2 | 30 | 30 | 30 |
| Aluminum hydroxide*3 | 20 | 20 | 20 |
| Silane coupling agent*4 | 2 | 2 | 2 |
| Stearic acid | 2 | 2 | 2 |
| Zinc oxide | 3 | 3 | 3 |
| Vulcanization accelerator TBBS*5 | 1.5 | 1.5 | 1.5 |
| Sulfur | 1.5 | 1.5 | 1.5 |
| Mooney viscosity ($ML_{1+4}$) at 130° C. (indexed number) | 100 | 86 | 87 |
| Elastic modulus ($M_{300}$) (indexed number) | 100 | 62 | 107 |
| Aging property (indexed number) | 100 | 90 | 104 |

Note
*1SMR: Natural rubber (Standard Malaysian Rubber)
*2Silica: Nipsil AQ (trademark) manufactured by Nippon Silica Industrial Co., Ltd.
*3Aluminum hydroxide: Higilite H-43 (trademark) manufactured by Showa Denko K.K.
*4Silane coupling agent: Si69 (trademark) manufactured by Degussa Aktiengesellschaft
*5Vulcanization accelerator TBBS: N-t-butyl-2-benzothiazolylsulfenamide The rubber compositions of inventive Examples 10 and 11 were prepared by using the natural rubber I which had been prepared from the natural rubber latex with its amide linkages cleaved and which had non-rubber components. As seen from the above Table, the rubber compositions of Examples 10 and 11, as compared with Comparative Examples 7 and 9, are excellent in the processability because of their low Mooney viscosities and are improved in the elastic modulus and the aging property. The rubber compositions of Comparative Examples 8 and 10 are extremely poor in the elastic modulus and the aging property because the rubber compositions were prepared from the natural rubber II from which the non-rubber component was removed by centrifugation after cleaving amide linkages.

As described above, according to the production method of the natural rubber latex of the present invention, a natural rubber composition improved in the processability, the reinforcing property, and the abrasion resistance can be obtained. The natural rubber composition of the present invention is largely improved in its processability without adversely affecting the elastic modulus and the aging property inherent to natural rubber. A tire produced by using the rubber composition is well blanched in all the properties such as wet skid resistance, low fuel consumption and abrasion resistance at high level. Therefore, the present invention is applicable to tire applications as well as belts, horses, rubber vibration insulators, and other rubber products.

What is claimed is:

1. A method for producing a natural rubber master batch, which comprises a step for cleaving amide linkages in a natural rubber latex; and a step for mixing the latex, wherein the latex contains non-rubber components and the amide linkages have been cleaved in the previous step, with an aqueous slurry having been dispersed with at least one filler selected from the group consisting of carbon black, silica and an inorganic filler represented by the following Formula I:

$$nM^1 \cdot x\,SiO_y \cdot zH_2O \qquad (I)$$

wherein $M^1$ is at least one member selected from the group consisting of metals of aluminum, magnesium, titanium, calcium and zirconium, oxides of the preceding metals, hydroxides of the preceding metals, hydrates of the preceding oxides and hydroxides, and carbonates of the preceding metals; n is an integer of 1 to 5; x is an integer of 0 to 10; y is an integer of 2 to 5; and z is an integer of 0 to 10.

2. A method for producing a natural rubber master batch, which comprises a step for mixing a natural rubber latex with an aqueous slurry having been dispersed with at least one filler selected from the group consisting of carbon black, silica and an inorganic filler represented by Formula I as defined in claim 1, wherein (i) the particle size distribution of the filler in the aqueous slurry is 25 μm or less in terms of a volume average particle size (mv) and 30 μm or less in terms of a 90 volume % particle size (D90), and (ii) a 24M4DBP absorption of dried filler recovered from the aqueous slurry is maintained at 93% or more of that of the filler before dispersed into water.

3. The method according to claim 2, wherein the natural rubber latex is subjected to a step for cleaving amide linkages in the latex.

4. The method according to claim 1, wherein a protease and/or a derivative of aromatic polycarboxylic acid is used in the step for cleaving amide linkages.

5. The method according to claim 4, wherein the protease is an alkaline protease.

6. The method according to claim 1, wherein a surfactant is added to the natural rubber latex and/or the aqueous slurry.

7. The method according to claim 1, to wherein the silica is precipitated silica, fumed silica or colloidal silica.

8. The method according to claim 1, to wherein the inorganic filler of Formula I is at least one member selected from the group consisting of alumina ($Al_2O_3$); alumina monohydrate ($Al_2O_3 \cdot H_2O$); aluminum hydroxide; aluminum carbonate; magnesium hydroxide [$Mg(OH)_2$]; magnesium oxide (MgO); magnesium carbonate ($MgCO_3$); talc ($3MgO \cdot 4SiO_2 \cdot H_2O$); attapulgite ($5MgO \cdot 8SiO_2 \cdot 9H_2O$); titanium white ($TiO_2$); titanium black ($TiO_{2n-1}$); calcium oxide (CaO); calcium hydroxide: aluminum magnesium oxide ($MgO \cdot Al_2O_3$); clay ($Al_2O_3 \cdot 2SiO_2$); kaolin ($Al_2O_3 \cdot 2SiO_2 \cdot 2H_2O$); pyrophyllite ($Al_2O_3 \cdot 4SiO_2 \cdot H_2O$); bentonite ($Al_2O_3 \cdot 4SiO_2 \cdot 2H_2O$); aluminum silicate ($Al_2SiO_5$, $Al_4 \cdot 3SiO_4 \cdot 5H_2O$); magnesium silicate ($Mg_2SiO_4$, $MgSiO_3$); calcium silicate ($Ca_2 \cdot SiO_4$, etc.); aluminum calcium silicate ($Al_2O_3 \cdot CaO \cdot 2SiO_2$); magnesium calcium silicate ($CaMgSiO_4$); calcium carbonate ($CaCO_3$); zirconium oxide ($ZrO_2$); zirconium hydroxide [$ZrO(OH)_2 \cdot nH_2O$]; zirconium carbonate [$Zr(CO_3)_2$]; and crystalline alumino silicates.

9. The method according to claim 1, to wherein $M^1$ of Formula I is at least one member selected from the group consisting of aluminum metal, oxides of aluminum, hydroxides of aluminum, hydrates of the oxides and hydroxides and carbonates of aluminum.

10. The method according to claim 1, to further comprising a step for drying a coagulated natural rubber master batch while applying a mechanical shearing force.

11. The method according to claim 10, wherein the drying step is carried out in a continuous kneader.

12. The method according to claim 11, wherein the continuous kneader is a twin-screw kneading extruder.

13. A natural rubber master batch produced by:
a step for mixing a natural rubber latex, which contains non-rubber components and has had its amide linkages cleaved, and an aqueous slurry having been dispersed with at least one filler selected from the group consisting of carbon black, silica and an inorganic filler represented by the following Formula I:

$$nM^1 \cdot xSiO_y \cdot zH_2O \qquad (I)$$

wherein $M^1$ is at least one member selected from the group consisting of metals of aluminum, magnesium, titanium, calcium and zirconium, oxides of the preceding metals, hydroxides of the preceding metals, hydrates of the preceding oxides and hydroxides, and carbonates of the preceding metals; n is an integer of 1 to 5; x is an integer of 0 to 10; y is an integer of 2 to 5; and z is an integer of 0 to 10; and a step for coagulating the resulting mixture.

14. A natural rubber master batch produced by the method as described in claim 2.

15. A natural rubber master batch produced by the method as described in claim 3.

16. A rubber composition comprising the natural rubber master batch as described in any one of claim 13.

17. A natural rubber composition comprising (A) a natural rubber containing a non-rubber component which is obtained by cleaving amide linkages of a natural rubber latex and (B) silica and/or a inorganic filler represented by the following Formula I:

$$nM^1 \cdot xSiO_y \cdot zH_2O \qquad (I)$$

wherein $M^1$ is at least one member selected from the group consisting of metals of aluminum, magnesium, titanium, calcium and zirconium, oxides of the preceding metals, hydroxides of the preceding metals, hydrates of the preceding oxides and hydroxides, and carbonates of the preceding metals; n is an integer of 1 to 5; x is an integer of 0 to 10; y is an integer of 2 to 5; and z is an integer of 0 to 10.

18. The natural rubber composition according to claim 17, further comprises a coupling agent.

19. A tire produced by using the rubber composition as described in claim 16.

* * * * *

UNITED STATES PATENT AND TRADEMARK OFFICE
CERTIFICATE OF CORRECTION

| | | |
|---|---|---|
| PATENT NO. | : 6,841,606 B2 | Page 1 of 1 |
| APPLICATION NO. | : 10/200452 | |
| DATED | : January 11, 2005 | |
| INVENTOR(S) | : Kazuhiro Yanagisawa, Kazuaki Someno and Uchu Mukai | |

It is certified that error appears in the above-identified patent and that said Letters Patent is hereby corrected as shown below:

FOREIGN PATENT DOCUMENTS

[EP     11071408      3/1999] JP  11-071408   3/1999

Signed and Sealed this

Fifth Day of September, 2006

JON W. DUDAS
*Director of the United States Patent and Trademark Office*